UNITED STATES PATENT OFFICE.

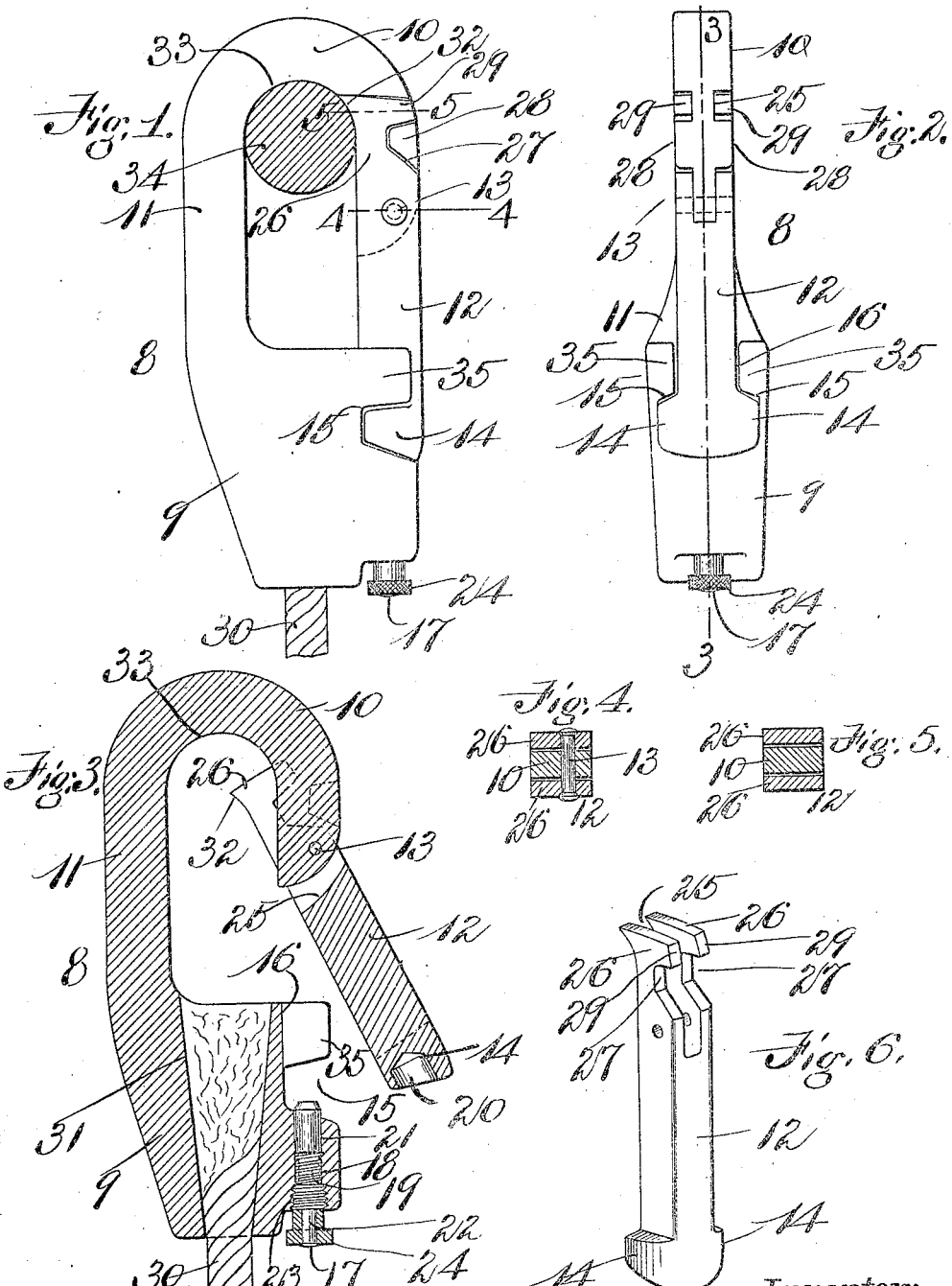
No. 878,060. PATENTED FEB. 4, 1908.
R. A. HAMMOND.
ROPE SOCKET.
APPLICATION FILED OCT. 16, 1906.

ROBERT A. HAMMOND, OF SANDWICH, MASSACHUSETTS.

ROPE-SOCKET.

No. 878,060.  Specification of Letters Patent.  Patented Feb. 4, 1908.

Application filed October 16, 1906. Serial No. 339,192.

*To all whom it may concern:*

Be it known that I, ROBERT A. HAMMOND, a citizen of the United States, residing at Sandwich, in the county of Barnstable and State of Massachusetts, have invented new and useful Improvements in Rope-Sockets, of which the following is a specification.

This invention relates to an improvement in rope sockets, the same being particularly adapted for use where great strength is required as in elevators and hoisting mechanism where it is desirable to have the wire rope cable provided with an attachment or socket at one end thereof which can be readily attached to or detached from a rod, cable, or the like and when so attached that the socket shall possess as much strength to transmit strains as though permanently fastened to said rod or cable instead of being detachably fastened thereto.

The invention consists in the combination and arrangement of parts set forth in the following specification and particularly pointed out in the claims thereof.

Referring to the drawings: Figure 1 is a side elevation of my improved rope socket with a portion of wire cable attached thereto and a bar shown in section in connection therewith. Fig. 2 is a front elevation of the same. Fig. 3 is a section, partly in elevation, taken on line 3—3, Fig. 2, showing the locking arm open. Fig. 4 is a section, partly in elevation, taken on line 4—4, Fig. 1. Fig. 5 is a section on line 5—5, Fig. 1. Fig. 6 is a perspective view of the locking arm.

Like numerals refer to like parts throughout the several views of the drawings.

In the drawings, 8 is a hook consisting of a base 9, a curved end 10, and a standard 11, which connects said curved end 10 to the base 9. A locking arm 12 is journaled upon a pivot 13 fast to said curved end. The free end of said locking arm has lateral projections 14, 14 thereon which when the arm is closed or in the position illustrated in Fig. 1 project into notches 15, 15 upon opposite sides of a slot 16 formed in said base. The lateral projections 14, 14 form a T-head at the free end of the arm 12 which projects into a T-slot, said T-slot being formed as a whole by the slot 16 and the notches 15, 15 upon opposite sides thereof. The locking arm 12 is locked in the position illustrated in Fig. 1 by a pin 17 which is adapted to slide in a recess 18 in the base 9. A spring 19 holds said pin normally (illustrated in Fig. 1) with the upper end thereof projecting into a recess 20 in the T-head of the locking arm 12. The pin 17 consists of a head 21, and a shank 22. The shank 22 slides in a sleeve 23 having screw-threaded engagement with said base, the lower end of said shank projecting through a thumb piece or handle 24 and having its end headed over said thumb piece to secure the same thereto.

The spring 18 bears at its upper end against the underside of the head 21 and at its lower end against the sleeve 23. When it is desired to rock the locking arm 12 upon its pivot, the locking pin 17 is pulled downwardly by means of the thumb piece 24 to disengage said locking pin from the arm, whereupon said arm may be swung outwardly from the position illustrated in Fig. 1 to that illustrated in Fig. 3. The upper end of the arm 12 projects beyond the pivot 13 toward the curved end 10 and is bifurcated by a slot 25 into which the extremity of the curved end 10 projects. The two sides 26, 26 of the bifurcated portion of the arm 12 are notched at 27, 27 to receive lateral projections 28, 28 upon the curved end 10.

The projections 29, 29 upon the sides 26, 26 interlock with the projections 28, 28 upon the curved end 10 when the parts are in the position illustrated in Fig. 1. A cable 30 projects into a conical shaped hole 31 extending through the base 9 and is fastened therein by spreading the strands of the cable and pouring solder between said strands in a manner well known to those skilled in this art. The inner edge of said arm 12 has a projection 32 thereon which is preferably formed as a continuation of the curved inner edge 33 of said curved end.

The operation of my improved rope socket is as follows: Assuming the cable 30 to be attached to the base of the socket as illustrated and that it is desired to insert a rod or cable 34 in said socket, the arm 12 is first unlocked from the base 9 by pulling downwardly upon the thumb piece 24. The arm 12 is then swung upon its pivot outwardly from the position shown in Fig. 1 to that shown in Fig. 3. The rod or cable 34 is then inserted and the arm 12 forced backward into the position illustrated in Fig. 1 where it is locked by the spring pin 17. When the rod 34 is forced into the upper end of the space between the standard 11 and the arm 12, it contacts with the projection 32 and closes the arm 12 until it is locked in the position illustrated in Fig. 1 by the spring pin 17, said rod also tending to hold said arm in its locked position by pressing against the projection 32, when the device is in use.

Particular attention is called to the manner in which the two ends of the arm 12 are connected to the hook, the strength of said connection not depending upon the pivot 13 at the upper end of said arm, but upon the interlocking projections 28 and 29 so far as longitudinal strain is concerned, and the strength of the device at the lower end of the arm depending upon the lateral projections 14, 14, which project into the notches 15, 15 in the base 9 and bear against the underside of the projections 35, 35 upon said base when longitudinal strain is applied to the device. Lateral strain or displacement of the parts with relation to each other is guarded against by the arm 12 projecting between the projections 35, 35 at its lower end and by the curved end projecting into the slot 25 of the bifurcated portion of the arm at its upper end, so that although the arm 12 is pivoted to the hook portion and can be rocked thereon after introducing a rod or cable in the space between said arm and the standard 11, yet when the parts are locked in the position illustrated in Fig. 1, the hook with its arm forms a rope socket which is substantially as strong as though the arm, standard, curved end, and base were all in one piece like the link of a chain.

Having thus described my invention, what I claim and desire by Letters Patent to secure is:

1. A rope socket comprising in its construction a hook and a locking arm pivoted thereto, said arm constructed to interlock at its opposite ends with said hook.

2. A rope socket comprising in its construction a hook, a locking arm pivoted thereto, means to lock said arm against rotation, and projections upon opposite ends of said arm adapted to interlock with said hook.

3. A rope socket comprising in its construction a hook consisting of a base, a curved end and a standard connecting said curved end to said base; and a locking arm pivoted to said curved end, said locking arm having projections thereon at opposite ends thereof adapted to interlock with said base and hook, respectively.

4. A rope socket comprising in its construction, a hook consisting of a base, a curved end, and a standard connecting said curved end to said base; a locking arm pivoted to said curved end, the free end of said arm having lateral projections thereon forming a T-head adapted to project into a T-slot provided in said base, and a spring pin adapted to slide longitudinally of said base to enter a recess in said T-head.

5. A rope socket comprising in its construction, a hook consisting of a base, a curved end, and a standard connecting said curved end to said base; a pivot on said curved end, and a locking arm journaled upon said pivot, said locking arm projecting beyond said pivot toward said curved end and having a projection thereon adapted to interlock with a projection on said curved end.

6. A rope socket comprising in its construction, a hook consisting of a base, a curved end, and a standard connecting said curved end to said base; a pivot on said curved end, and a locking arm journaled on said pivot, said locking arm bifurcated to receive the extremity of said curved end and having notches provided therein to receive lateral projections upon said curved end.

7. A rope socket comprising in its construction, a hook consisting of a base, a curved end, and a standard connecting said curved end to said base; a pivot on said curved end, and a locking arm journaled on said pivot, said locking arm bifurcated to receive the extremity of said curved end and having notches provided therein to receive lateral projections upon said curved end, the free end of said arm having lateral projections thereon forming a T-head adapted to project into a T-slot provided in said base.

8. A rope socket comprising in its construction, a hook consisting of a base, a curved end, and a standard connecting said curved end to said base; a pivot on said curved end, and a locking arm journaled to rock upon said pivot, said locking arm having a projection thereon extending beyond said pivot toward said curved end, the inner edge of said projection forming, when said arm is closed, a continuation of the inner edge of said curved end.

In testimony whereof I have hereunto set my hand in presence of two subscribing witnesses.

ROBERT A. HAMMOND.

Witnesses:
   HELEN LIVERMORE,
   A. ALFMIE.